United States Patent
Park et al.

(10) Patent No.: US 7,330,741 B2
(45) Date of Patent: Feb. 12, 2008

(54) SCENT BOTTLE TYPE PORTABLE WIRELESS TERMINAL

(75) Inventors: Seung-Min Park, Seoul (KR); Seok-Jin Kim, Yokohama (JP); In-Gon Park, Seoul (KR); Sang-Min Hyun, Seoul (KR); Jung-Hyeok Im, Songnam-shi (KR); Ji-Young Lee, Jeju-shi (KR); Sung-Kwon Kim, Seoul (KR)

(73) Assignee: Samsung Electronics., Ltd. (KR)

( * ) Notice: Subject to any disclaimer, the term of this patent is extended or adjusted under 35 U.S.C. 154(b) by 901 days.

(21) Appl. No.: 10/770,104

(22) Filed: Feb. 2, 2004

(65) Prior Publication Data

US 2004/0162118 A1 Aug. 19, 2004

(30) Foreign Application Priority Data

Feb. 17, 2003 (KR) .................. 10-2003-0009831

(51) Int. Cl.
*H04M 1/00* (2006.01)

(52) U.S. Cl. .................... 455/575.1; 379/441

(58) Field of Classification Search ............. 455/556.1, 455/557, 575.1; 379/441, 447, 451, 455
See application file for complete search history.

(56) References Cited

U.S. PATENT DOCUMENTS 6,058,293 A 5/2000 Phillips

FOREIGN PATENT DOCUMENTS

| CN | 1238629 | 12/1999 |
|---|---|---|
| FR | 2 818 480 | 6/2002 |
| WO | WO 02/01270 | 1/2002 |
| WO | WO 02/11439 | 2/2002 |

*Primary Examiner*—Tu Nguyen
(74) *Attorney, Agent, or Firm*—The Farrell Law Firm, PC

(57) ABSTRACT

Disclosed herein is a scent bottle type portable wireless terminal. The scent bottle type portable wireless terminal includes a body housing, a band shape rim unit surrounding upper and lower surfaces and a pair of side surfaces of the body housing, a rotatable lens housing provided between the body housing and the rim unit, the lens housing extending in a longitudinal direction of the body housing, one or more openings defined between the body housing, the lens housing and the rim unit, and a rotatable handle coaxially extending relative to the lens housing so that it protrudes outwardly from an outer surface of the rim unit.

16 Claims, 5 Drawing Sheets

SCENT BOTTLE TYPE PORTABLE WIRELESS TERMINAL

PRIORITY

This application claims priority to an application entitled "SCENT BOTTLE TYPE PORTABLE WIRELESS TERMINAL", filed in the Korean Intellectual Property Office on Feb. 17, 2003 and assigned Serial No. 2003-9831, the contents of which are incorporated herein by reference.

BACKGROUND OF THE INVENTION

1. Field of the Invention

The present invention relates generally to a portable wireless terminal including a cellular phone, a Personal Digital Assistant (PDA), a Hand Held Phone (HHP), and more particularly to a scent bottle type portable wireless terminal, which is designed to imitate the appearance of scent bottles that a user may carry.

2. Description of the Related Art

Generally, "portable wireless terminals" are devices that are portable and enable owners of the devices to communicate wirelessly. Such portable wireless terminals tend toward slimness and lightness in consideration of portability thereof, and toward more various functions. These tendencies towards miniaturization in size and weight as well as diversification in functions and applications of the portable wireless terminals will deepen in the future, and these terminals may be modified to be suitable for various multimedia environments or internet environments.

On the basis of their forms, conventional portable wireless terminals may be classified into a bar-type wireless terminal, a flip-type wireless terminal, and a folder-type wireless terminal. The bar-type wireless terminal includes a single housing, the flip-type wireless terminal includes a bar-type housing and a flip part pivotably attached to the housing, and the folder-type wireless terminal includes a bar-type housing and a folder part pivotably attached to the housing in a foldable manner.

Additionally, on the basis of the manner or positions in which they are worn, the portable wireless terminals may be classified into a necklace-type terminal configured to be worn around the neck of the user using a lanyard or lace, and a wrist-type terminal configured to be worn on the wrist of the user.

Furthermore, on the basis of their opening/closing manners, the portable wireless terminals may be classified into a rotation type wireless terminal, and a sliding type wireless terminal. In the rotation-type wireless terminal, two housings are rotatably connected to be opened or closed relative to the other while facing each other. In the sliding-type wireless terminal, two housings are opened or closed relative to the other while facing each other. Those skilled in the art will appreciate the various portable wireless terminals as described above.

The portable wireless terminals, however, have a problem in that the users may easily become bored with the use thereof since they always carry the terminals.

The use of the portable wireless terminals is generalized without distinction of age or sex, or time and place, and accordingly development of new designs of the portable wireless terminals is increasing. As part of such a development, a scent bottle design is proposed. Most women usually carry cosmetics such as a compact, a scent bottle or lipstick in her purse or bag, in consideration of interpersonal relations. Especially, in case of scent bottles, increasing numbers of men carry them. According to this world trend, the present invention provides a new portable wireless terminal, which is obtained by adopting the design of scent bottles that many people often carry.

SUMMARY OF THE INVENTION

Therefore, the present invention has been made in view of the above problem, and it is an object of the present invention to provide a portable wireless terminal providing a new aesthetic sense.

It is another object of the present invention to provide a portable wireless terminal, which is convenient in rotating operation of a lens housing provided therein.

In accordance with one aspect of the present invention, the above and other objects can be accomplished by the provision of a scent bottle type portable wireless terminal including: a body housing; a band shape rim unit surrounding upper and lower surfaces and a pair of side surfaces of the body housing; a rotatable lens housing provided between the body housing and the rim unit, the lens housing extending in a longitudinal direction of the body housing; one or more openings defined between the body housing, the lens housing and the rim unit; and a rotatable handle coaxially extending relative to the lens housing so that it protrudes outwardly from an outer surface of the rim unit.

In accordance with another aspect of the present invention, there is provided a scent bottle type portable wireless terminal including: a body housing; a rotatable lens housing provided between the body housing and a rim unit surrounding the body housing, the lens housing extending in a longitudinal direction of the body housing; and a rotatable handle coaxially extending relative to the lens housing so that it protrudes outwardly from an outer surface of the rim unit, the handle serving as an antenna unit.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
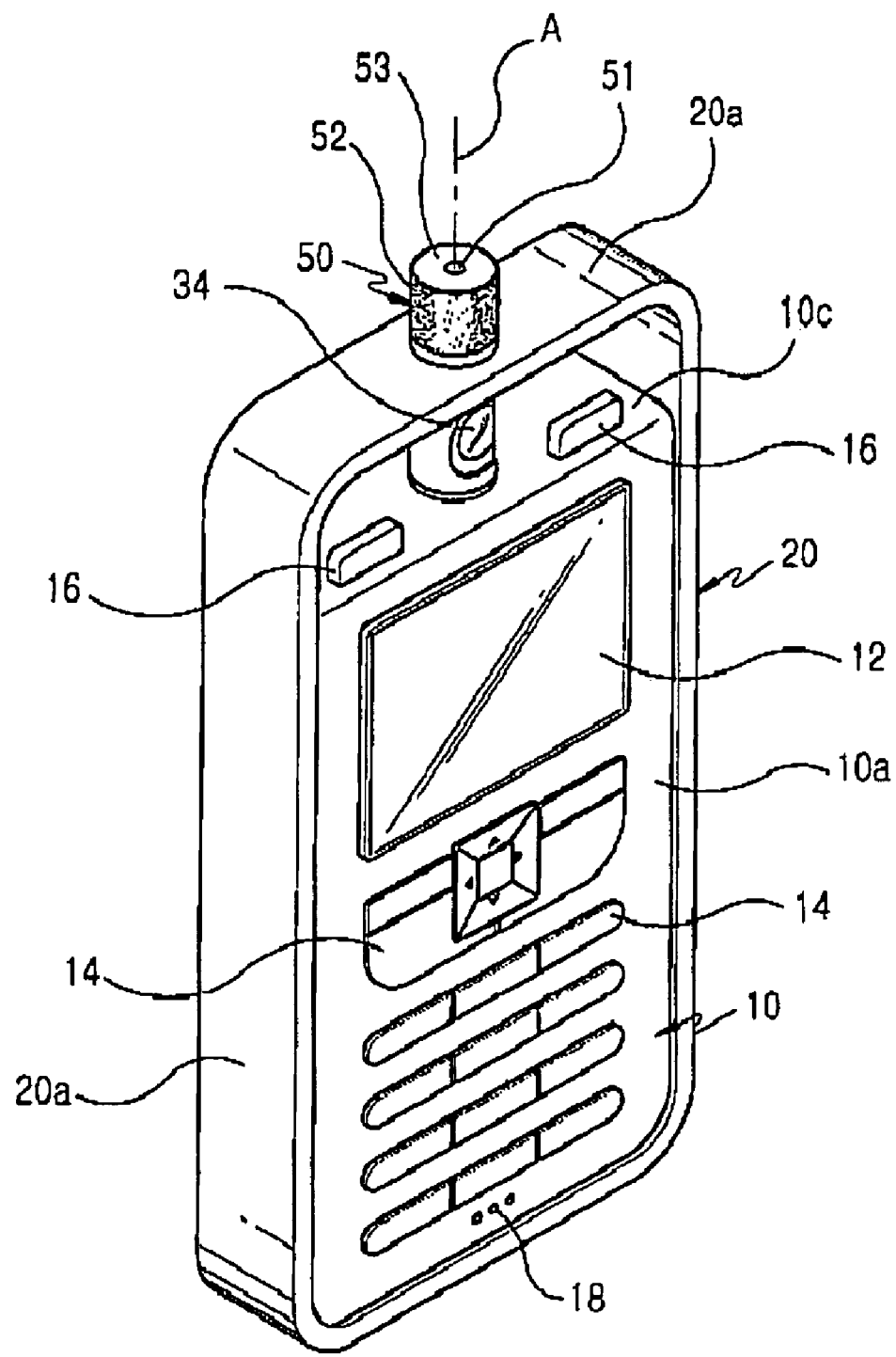
FIGS. 1 and 2 are perspective views illustrating a scent bottle type portable wireless terminal in accordance with a preferred embodiment of the present invention.
Figure 2:
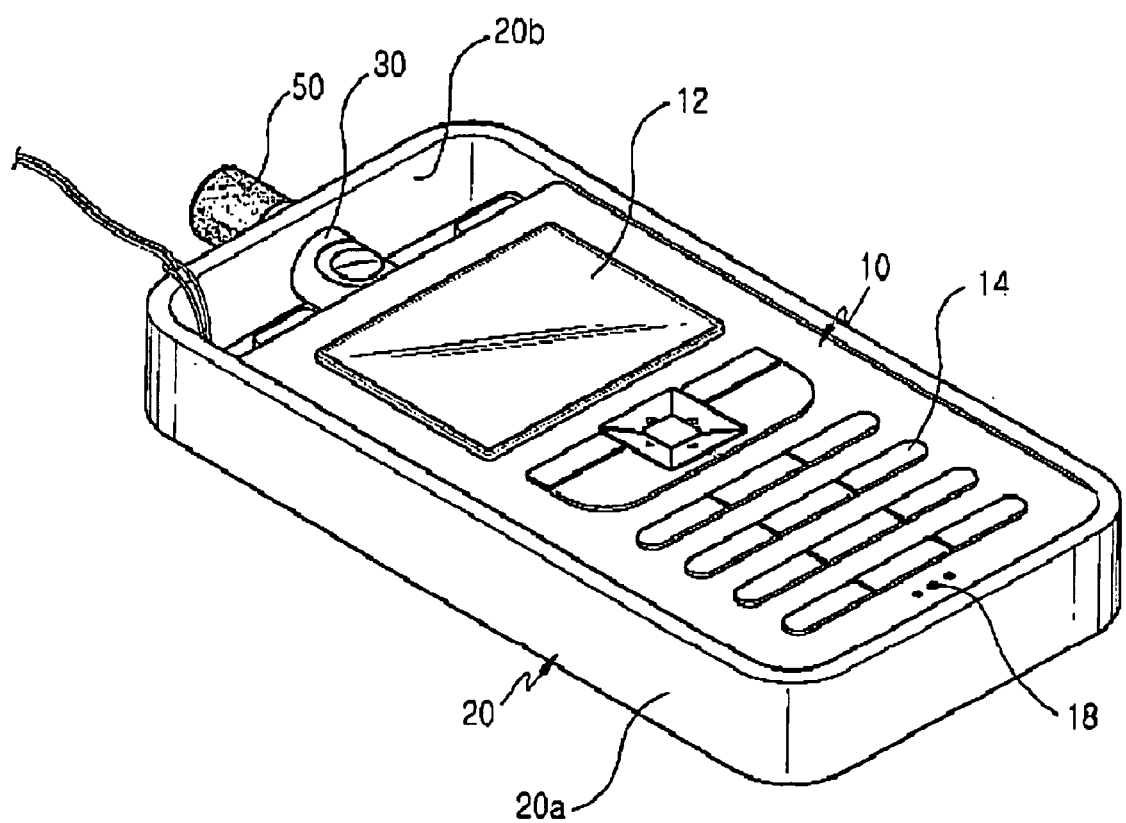

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted for clarity where they are well-known in the art. Also, the terms used in the following description are terms defined taking into consideration the functions obtained in accordance with the present invention. The definitions of these terms should be determined based on the whole content of this specification, and may be changed in accordance with the option of a user or a usual practice.

Regardless of age or sex, or time and place, the use of "portable wireless terminals", such as a Personal Digital Assistant (PDA), a cellular phone, a Hand Held Phone (HHP), and a digital phone, has become commonplace. The user can communicate with others wirelessly using the portable wireless terminals. Therefore, the portable wireless terminals are in the spotlight as life necessities of modern people, and various multi-function portable wireless terminals must be produced in the future. As described above, a value of the portable wireless terminal may depend largely on an external design thereof as well as the various functions. If a malfunction of the portable wireless terminal occurs, it has to be repaired or exchanged with a new one.

Even if there is no malfunction, users often exchange their old portable wireless terminal with the newest one if they are bored with the design of the terminal. The portable wireless terminal tends to be recognized as an important element capable of representing the unique character of the user to others. A portable wireless terminal according to the preferred embodiment of the present invention is designed to enable the user to feel as if he/she carries a scent bottle, thereby providing a unique feeling when in use. In addition, the present invention is provided to enable the user to recognize a portable wireless terminal as a necessity.

As illustrated in FIGS. 1 to 4, the portable wireless terminal of the preferred embodiment of the present invention is obtained by introducing the design of "scent bottles" that the user may carry. The portable wireless terminal of the preferred embodiment of the present invention includes a body housing 10, a rim unit 20 having a band shape surrounding upper and lower surfaces and a pair of side surfaces of the body housing 10, a rotatable lens housing 30 extending vertically from the upper surface of the body housing 10, and one or more openings 40 defined between the body housing 10 and the rim unit 20. The upper surface of the body housing 10 is denoted as reference numeral 10c, and the other lower surface and a pair of side surfaces of the body housing 10 are not shown.

Figure 3:
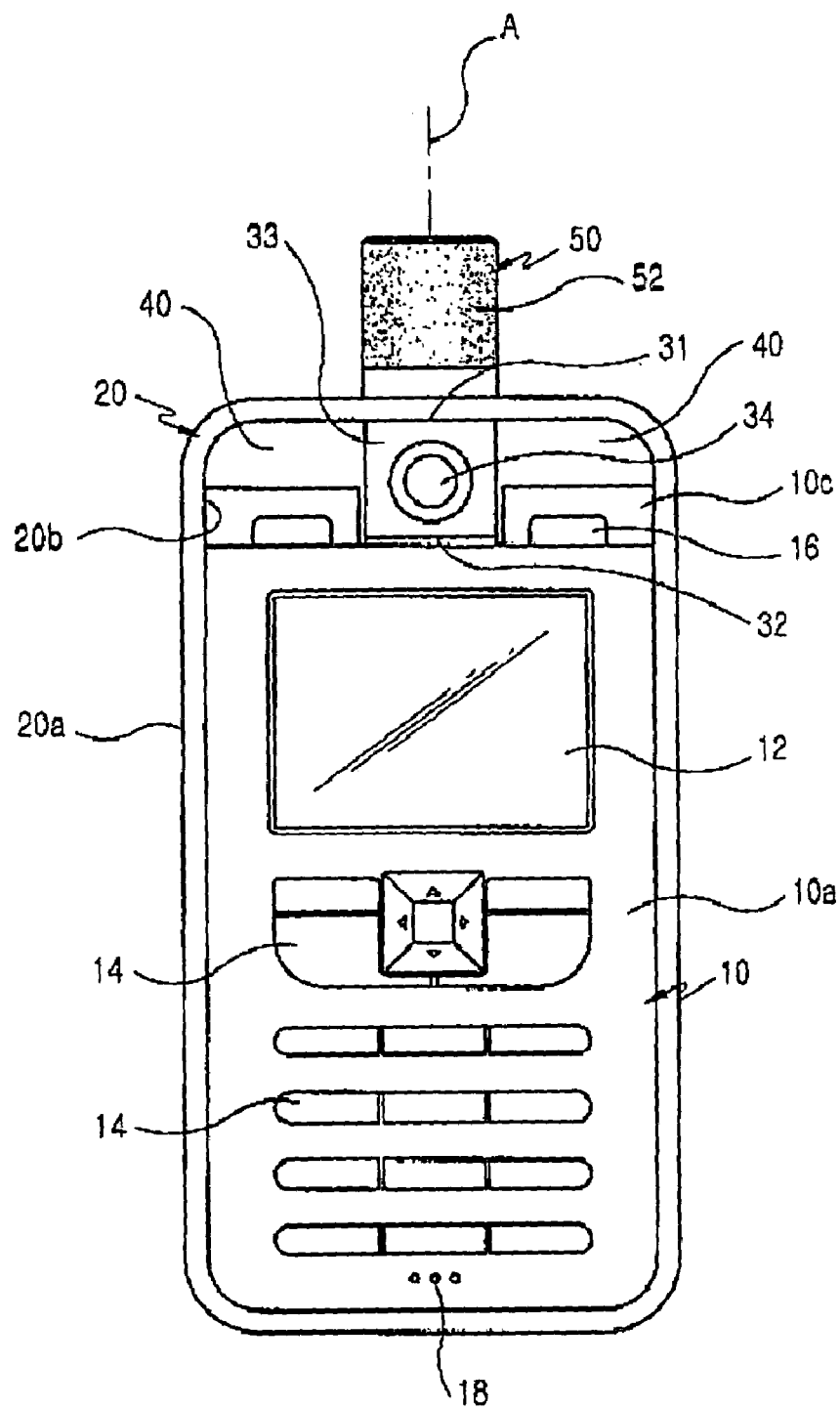
FIG. 3 is a front view of the scent bottle type portable wireless terminal shown in FIG. 1.

Referring to FIG. 3, the openings 40 include two openings symmetrically arranged at left and right sides of an upper portion of the rim unit 20. Each of the openings 40 is defined by an inner surface 20b of the rim unit 20, the lens housing 30 and the upper surface 10c of the body housing 10. The openings 40 preferably serve as holding holes for carrying accessories representing the unique character of the user.

Figure 4:
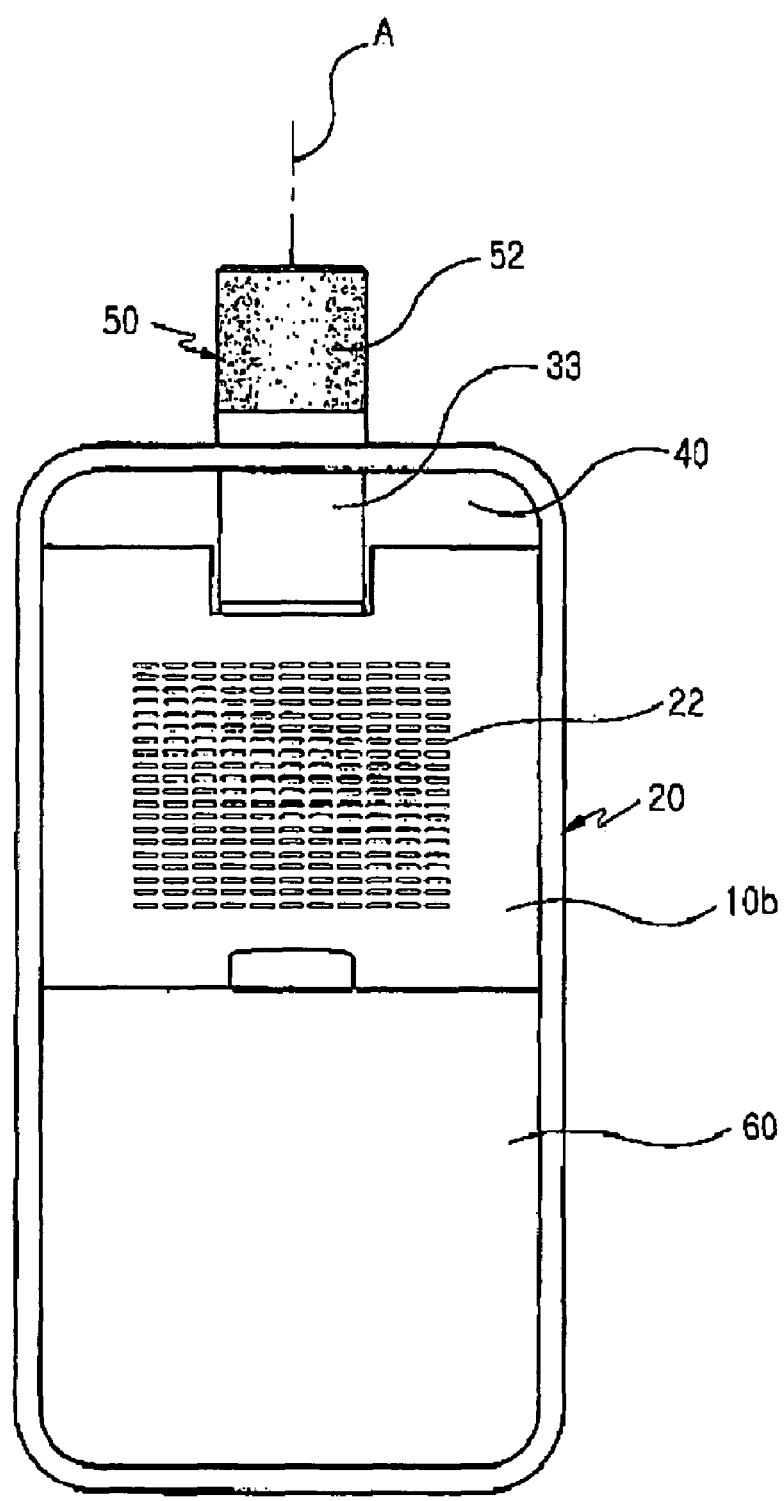
FIG. 4 is a rear view of the scent bottle type portable wireless terminal shown in FIG. 1.

Referring to FIG. 1, the body housing 10 includes a front surface 10a and a rear surface 10b (shown in FIG. 4), in addition to the upper and lower surfaces and a pair of side surfaces thereof. The front surface 10a of the body housing 10 is provided with a display unit 12, a plurality of keys 14, and a microphone 18 located preferably at the lowermost side. The upper surface 10c of the body housing 10 is provided with two keys 16 symmetrically arranged at left and right sides of the upper portion of the rim unit 20. These two keys 16 are used for zoom-in and zoom-out operations of a camera unit. As illustrated in FIG. 4, the rear surface 10b of the body housing 10 is provided with a speaker 22, and a separable battery pack 60.

The rotatable lens housing 30 (shown in FIG. 2) has a cylindrical shape extending in a longitudinal direction of the body housing 10 between the upper surface 10c of the body housing 10 and the rim unit 20. The lens housing 30 is installed at a preferred position of an outer peripheral surface 33 thereof with a camera lens 34, and designed to rotate preferably within a range of about 180°. The lens housing 30 contacts with the upper surface 10c of the body housing 10 at a lower surface 32 thereof, and contacts with the inner surface 20b of the rim unit 20 at an upper surface 31(shown in FIG. 3) thereof. The camera lens 34 can be rotatable to face the same direction as the) front surface 10a or rear surface 10b of the body housing 10.

The portable wireless terminal is integrally installed with a rotatable handle 50, which is coaxially constructed with the lens housing 30 (shown in FIG. 2) about a rotation axis A. The rotatable handle 50 has preferably the same diameter as the lens housing 30 and extends in a longitudinal direction of the lens housing 30. The rotatable handle 50 has preferably a cylindrical shape formed at an outer peripheral surface 52 thereof with fine bosses for facilitating the rotating operation thereof. The rotatable handle 50 is formed at an upper surface 53 thereof with an ear microphone jack hole 51.

Preferably, the rim unit 20 has a band shape surrounding the body housing 10 and the lens housing 30, thereby serving to protect the body housing 10 and the lens housing 30 from any external shock applied to the periphery thereof.

As the handle 50 rotates about the rotation axis A, the lens housing 30 simultaneously rotates about the rotation axis A, thereby allowing the orientation of the camera lens 34 to be manually adjusted.

Commonly, the portable wireless terminals have a risk of being dropped. The user may drop the portable wireless terminal during use or carrying of the terminal, and, thus the user may have to exchange the terminal for a new one due to breakage of the portable wireless terminal. The portable wireless terminal of the preferred embodiment of the present invention is made of certain materials as follows. The rim unit 20 and rotatable handle 50 are preferably made of a light-weight metal material, because they are positioned along the periphery of the body housing 10. The rim unit 20 and rotatable handle 50 are preferably made of an aluminum alloy. The breakage of the portable wireless terminal can be prevented even in case of falling. The body housing 10 and lens housing 30 are preferably made of a plastic material.

Figure 5:
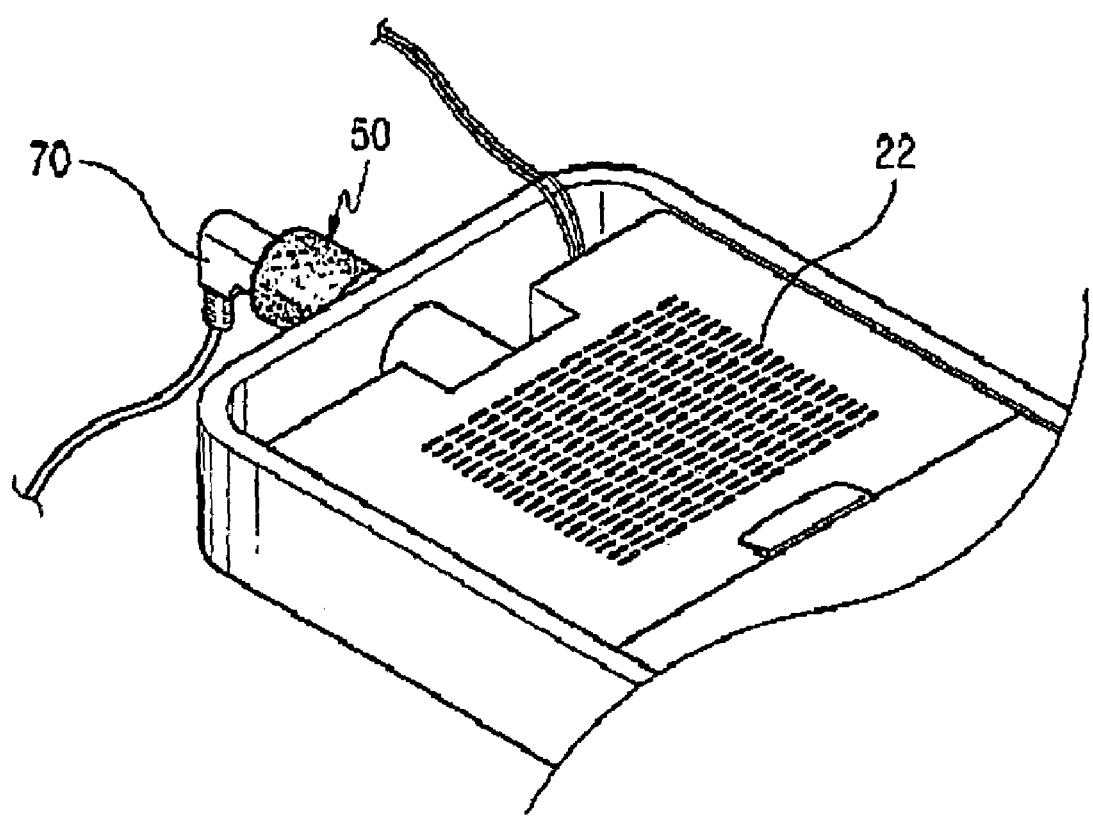
FIG. 5 is a rear view in partial cut-away illustrating a state wherein an ear microphone jack is connected to the scent bottle type portable wireless terminal in accordance with the preferred embodiment of the present invention.

FIG. 5 illustrates an ear microphone jack 70 connected to the ear microphone jack hole 51 (shown in FIG. 1) provided at the upper surface 53 of the rotatable handle 50.

As apparent from the above description, the portable wireless terminal of the preferred embodiment of the present invention is integrally formed with the rotatable handle having the ear microphone jack hole, and the rotatable handle also serves as an antenna unit. In addition, the portable wireless terminal includes a rotatable lens housing having the camera lens, which is coaxially installed relative to the rotatable handle. Such configuration of the portable wireless terminal maximizes convenience in use thereof.

According to the preferred embodiment of the present invention, it is easy to alter the orientation angle of the camera lens using the rotatable handle. Furthermore, the ear microphone jack hole is formed at the rotatable handle, resulting in convenience in use. The portable wireless terminal according to the present invention enables the user to feel fashionable and stylish from a scent bottle design thereof.

As stated above, the present invention introduces the scent bottle design into the portable wireless terminal, thereby providing freshness to the user and enabling the user to express his/her unique character. Especially, the present invention simplifies rotating operation of the lens housing, and enables convenient connection of an ear microphone jack.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A scent bottle type portable wireless terminal comprising:
    a body housing;
    a rim unit having a band shape surrounding upper and lower surfaces and a pair of side surfaces of the body housing;
    a rotatable lens housing provided between the body housing and the rim unit, the lens housing extending in a longitudinal direction of the body housing;
    at least one opening defined between the body housing, the lens housing and the rim unit; and
    a rotatable handle coaxially extending relative to the lens housing and protruding outwardly from an outer surface of the rim unit.

2. The terminal as set forth in claim 1, wherein the body housing further comprises a front surface and a rear surface of the body housing, and
    wherein the front surface of the body housing is provided with a display unit, a plurality of keys, and a microphone, the rear surface of the body housing is provided with a speaker, and the upper surface of the body housing is provided with camera lens operation keys symmetrically arranged at left and right sides of the upper surface of the body housing.

3. The terminal as set forth in claim 1, wherein the lens housing is formed to have a cylindrical shape, and has an upper surface contacting an inner surface of the rim unit, and a lower surface contacting the upper surface of the body housing.

4. The terminal as set forth in claim 1, wherein the rotatable handle is formed to have a cylindrical shape, and has a lower surface contacting the outer surface of the rim unit.

5. The terminal as set forth in claim 1, wherein the rotatable handle is provided at its outer peripheral surface with bosses for facilitating rotating operation thereof, and further provided at an upper surface thereof with an ear microphone jack hole.

6. The terminal as set forth in claim 1, wherein the rim unit is made of a light-weight metal material.

7. The terminal as set forth in claim 1, wherein the rotatable handle is made of a light-weight metal material.

8. The terminal as set forth in claim 1, wherein the openings are defined by the upper surface of the body housing, the lens housing, and the inner surface of the rim unit, thereby serving as holding holes.

9. A scent bottle type portable wireless terminal comprising:
    a body housing;
    a rotatable lens housing provided between a body housing and a rim unit surrounding the body housing, the lens housing extending in a longitudinal direction of the body housing; and
    a rotatable handle coaxially extending relative to the lens housing and protruding outwardly from an outer surface of the rim unit.

10. The terminal as set forth in claim 9, wherein the body housing further comprises a front surface and a rear surface, upper and lower surfaces and a pair of side surfaces, and
    wherein the front surface of the body housing is provided with a display unit, a plurality of keys, and a microphone, the rear surface of the body housing is provided with a speaker, and the upper surface of the body housing is provided with camera lens operation keys symmetrically arranged at left and right sides of the upper surface of the body housing.

11. The terminal as set forth in claim 9, wherein the lens housing is formed to have a cylindrical shape, and has an upper surface contacting an inner surface of the rim unit, and a lower surface contacting the upper surface of the body housing.

12. The terminal as set forth in claim 9, wherein the rotatable handle is formed to have a cylindrical shape, and has a lower surface contacting the outer surface of the rim unit.

13. The terminal as set forth in claim 9, wherein the rotatable handle is provided at its outer peripheral surface with bosses for facilitating rotating operation thereof, and further provided at an upper surface thereof with an ear microphone jack hole.

14. The terminal as set forth in claim 9, wherein the rim unit is made of a light-weight metal material.

15. The terminal as set forth in claim 9, wherein the rotatable handle is made of a light-weight metal material.

16. The terminal as set forth in claim 9, wherein the rotatable handle is provided with a pair of openings at both sides thereof, respectively.

* * * * *